(12) United States Patent
Sanchez et al.

(10) Patent No.: US 8,738,523 B1
(45) Date of Patent: May 27, 2014

(54) SYSTEMS AND METHODS TO IDENTIFY AND PROFILE A VEHICLE OPERATOR

(71) Applicant: State Farm Mutual Automobile Insurance Company, Bloomington, IL (US)

(72) Inventors: Kenneth J. Sanchez, Bloomington, IL (US); Aaron S. Chan, Lisle, IL (US); Matthew R. Baker, Franklin, TN (US); Matthew Zettinger, Glen Ellyn, IL (US); Brian Fields, Normal, IL (US); John A. Nepomuceno, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/897,646

(22) Filed: May 20, 2013

Related U.S. Application Data

(60) Provisional application No. 61/793,939, filed on Mar. 15, 2013.

(51) Int. Cl.
*G06Q 40/00* (2012.01)
(52) U.S. Cl.
USPC .................................................. 705/39; 705/4

(58) Field of Classification Search
USPC ....................................................... 705/39, 4
See application file for complete search history.

(56) References Cited

U.S. PATENT DOCUMENTS

| | | | |
|---|---|---|---|
| 2010/0131300 A1* | 5/2010 | Collopy et al. | 705/4 |
| 2013/0182079 A1 | 7/2013 | Holz | |
| 2013/0182897 A1 | 7/2013 | Holz | |
| 2013/0182902 A1 | 7/2013 | Holz | |
| 2013/0204645 A1* | 8/2013 | Lehman et al. | 705/4 |

OTHER PUBLICATIONS

York, Jim; "Identifying high-risk drivers"; Fleet Owner; Jul. 2001.*
Anonymous; "GreenRoad allowing data integration with third-party systems"; Fleet Owner; Sep. 15, 2011.*

* cited by examiner

*Primary Examiner* — Edward Chang
(74) *Attorney, Agent, or Firm* — Marshall, Gerstein & Borun LLP; Randall G. Rueth

(57) ABSTRACT

A method for assessing risk associated with a driver of a vehicle includes receiving a plurality of risk variables associated with a driver, the plurality of risk variables being gathered when the driver operates the vehicle. A driver is then identified based on the plurality of risk variables, and a risk profile is developed for the driver. The development of the risk profile involves determining the risk associated with at least some of the risk variables and generating a risk index, the risk index being a collective measure of risk associated with the driver.

17 Claims, 8 Drawing Sheets

SYSTEMS AND METHODS TO IDENTIFY AND PROFILE A VEHICLE OPERATOR

RELATED APPLICATIONS

This application claims the benefit of priority of U.S. Provisional Patent Application No. 61/793,939, filed Mar. 15, 2013, the contents of which are hereby incorporated by reference, in their entirety and for all purposes, herein.

TECHNICAL FIELD

The present disclosure generally relates to determining the risk associated with a vehicle operator and, more particularly, to a method for gathering and analyzing risk related data.

BACKGROUND

A common automotive insurance practice is to rate vehicles with primary, secondary, etc. drivers to generate an appropriate insurance rate for a vehicle. To this end, insurance agents collect driver information from customers and determine levels of risk associated with the drivers of the vehicle. For example, a level of risk associated with a driver is commonly based on age, gender, driving history, etc.

However, information provided by insurance customers may not accurately identify drivers of a vehicle, much less the level of risk associated with those drivers. For example, insurance providers do not have easy access to information indicating who is driving the vehicle at specific times, how drivers of the vehicle perform under certain conditions (snow, rain, night, etc.), where the vehicle is driven, how drivers cognitively process important information while driving, etc.

SUMMARY

In one embodiment, a computer-implemented method for assessing risk associated with a driver of a vehicle comprises receiving, via a network interface, a plurality of risk variables associated with a driver, the plurality of risk variables being gathered when the driver operates the vehicle. The method further comprises causing one or more processors to identify the driver based on the plurality of risk variables, wherein identifying the driver includes: (i) clustering the plurality of risk variables into a plurality of groups of risk variables, and (ii) associating one of the plurality of groups of risk variables with the driver. Still further, the method comprises causing the one or more processors to develop a risk profile for the driver based on the associated groups of risk variables, wherein developing a risk profile for the driver includes: (i) determining the risk associated with at least some of the risk variables in the associated groups of risk variables, and (ii) generating a risk index, the risk index being a collective measure of risk associated with the driver based on the associated groups of risk.

In another embodiment, a computer device for assessing risk associated with a driver of a vehicle comprises one or more processors and one or more memories coupled to the one or more processors. The one or more memories include computer executable instructions stored therein that, when executed by the one or more processors, cause the one or more processors to receive, via a network interface, a plurality of risk variables associated with a driver, the plurality of risk variables being gathered when the driver operates the vehicle. Further, the computer executable instructions cause the one or more processors to identify the driver based on the plurality of risk variables, the identification of the driver including: (i) clustering the plurality of risk variables into a plurality of groups of risk variables, and (ii) associating one of the plurality of groups of risk variables with the driver. Still further, the computer executable instructions cause the one or more processors to develop a risk profile for the driver based on the associated groups of risk variables, wherein developing a risk profile for the driver includes: (i) determining the risk associated with at least some of the risk variables in the associated groups of risk variables, and (ii) generating a risk index, the risk index being a relative measure of risk associated with the driver based on the associated groups of risk variables.

In still another embodiment, a computer readable storage medium comprises non-transitory computer readable instructions stored thereon for assessing risk associated with a driver of a vehicle, the instructions, when executed on one or more processors, cause the one or more processors to receive, via a network interface, a plurality of risk variables associated with a driver, the plurality of risk variables being gathered when the driver operates the vehicle. The instructions further cause the one or more processors to identify the driver based on the plurality of risk variables, the identification of the driver including: (i) clustering the plurality of risk variables into a plurality of groups of risk variables, and (ii) associating one of the plurality of groups of risk variables with the driver. Also, the instructions further cause the one or more processors to develop a risk profile for the driver based on the associated groups of risk variables, wherein developing a risk profile for the driver includes: (i) determining the risk associated with at least some of the risk variables in the associated groups of risk variables, and (ii) generating a risk index, the risk index being a relative measure of risk associated with the driver based on the associated groups of risk variables;

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . ." or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

As used herein, the term "impairment" refers to any of a number of conditions that may reduce vehicle operator performance. A vehicle operator may be impaired if the vehicle operator is drowsy, asleep, distracted, intoxicated, ill, injured, suffering from a sudden onset of a medical condition, etc. Additionally, as used herein, the term "vehicle" may refer to any of a number of motorized transportation devices. A vehicle may be a car, truck, bus, train, boat, plane, etc. Additionally, as used herein, the term "driver" may refer to any operator of a vehicle. A driver may be a car driver, truck driver, bus driver, train engineer, captain of a boat, pilot of a plane, etc.

Figure 1:
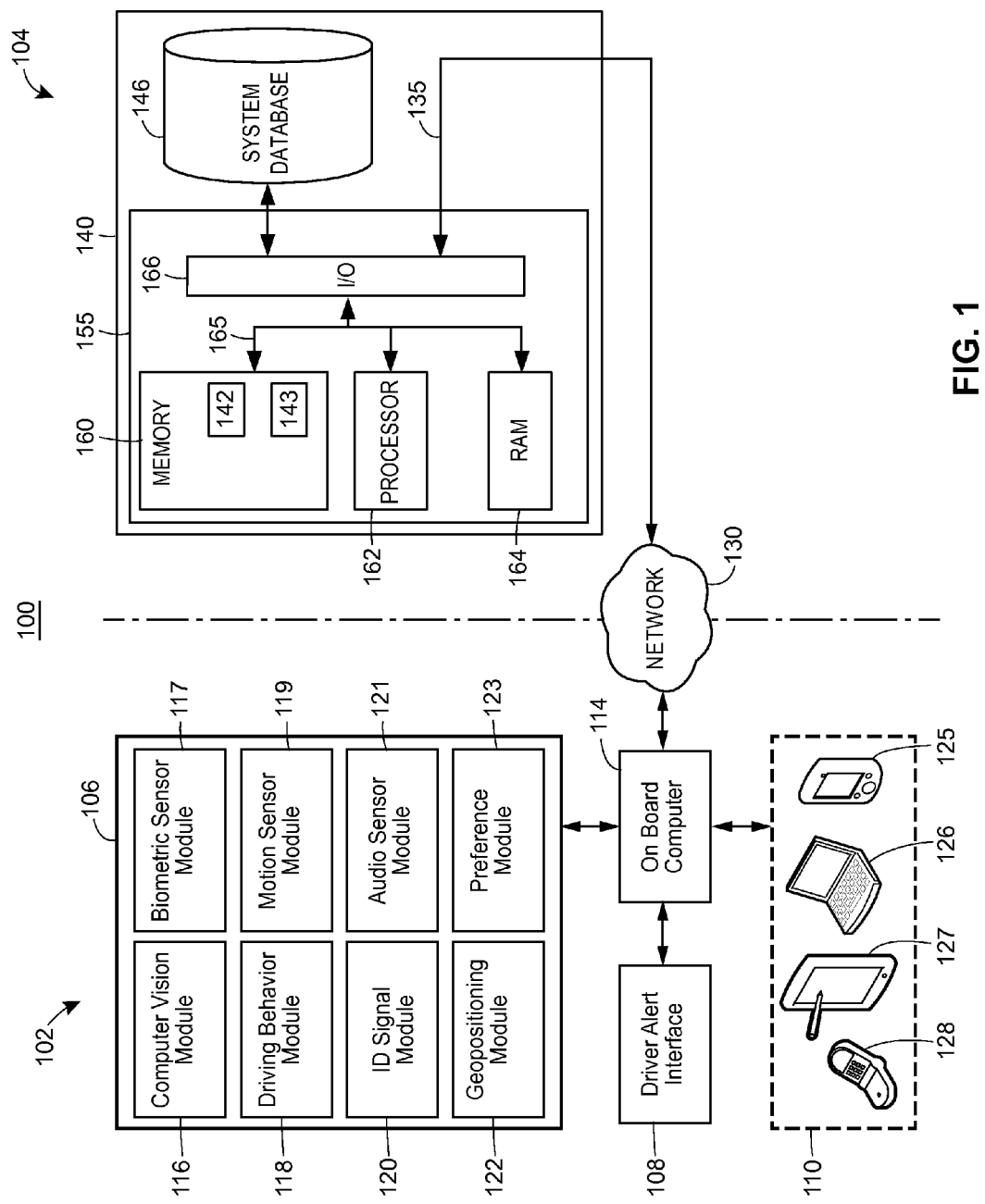
FIG. 1 illustrates an example system for gathering and analyzing risk variables associated with a vehicle operator.

FIG. 1 illustrates an example risk assessment system 100 for identifying the driver, or operator, of a vehicle and developing a risk profile for the driver. The high-level architecture includes both hardware and software applications, as well as various data communications channels for communicating data between the various hardware and software components. The risk assessment system 100 may be roughly divided into front-end components 102 and back-end components 104. The front-end components 102 may be mobile components disposed in the vehicle (e.g. car, truck, boat, etc.), and the back-end components 104 may stationary components, in an implementation.

The front end components 102 include one or more risk variable collection modules 106, a driver alert interface 108, and one or more mobile devices 110. Additionally, the front end components 102 may include an on-board computer 114, in an implementation. The on-board computer 114 may be permanently installed in the vehicle (not shown) and may interface with various sensors in the vehicle (e.g., a braking sensor, a speedometer, a tachometer, etc.) or in the risk variable collection modules 106. Further, the on-board computer 114 may interface with various external output devices in the vehicle such as the driver alert interface 108, one or more speakers (not shown), one or more displays (not shown), etc.

The one or more risk variable collection modules 106 may include, by way of example, a computer vision module 116, biometric sensor module 117, driving behavior module 118, motion sensor module 119, identification signal module 120, audio sensor module 121, geopositioning module 122, and user preference module 123. Each of the risk variable collection modules 116-123 may include sensors to gather data (e.g. accelerometers, cameras, microphones, gyroscopes, etc.), routines to analyze sensor data or otherwise manipulate sensor data, and/or interfaces for communication outside the vehicle (e.g. global positioning system (GPS) antennas, wireless network interfaces, etc.), for example. Details of the example risk modules 116-123 are discussed with reference to FIG. 2. The one or more mobile devices 110 may include, by way of example, a smart-phone 125, laptop/desktop computer 126, tablet computer 127, or web-enabled cell phone 128.

The front-end components 102 communicate with the back-end components 104 via the network 130. The network 130 may be a proprietary network, a secure public internet, a virtual private network or some other type of network, such as dedicated access lines, plain ordinary telephone lines, satellite links, combinations of these, etc. Where the network 130 comprises the Internet, data communications may take place over the network 130 via an Internet communication protocol.

The back-end components 104 include a server 140 with one or more computer processors adapted and configured to execute various software applications and components of the risk assessment system 100, in addition to other software applications. The server 140 further includes a database 146. The database 146 is adapted to store data related to the operation of the risk assessment system 100. Such data might include, for example, data collected by the front-end components 102 pertaining to the risk assessment system 100 and uploaded to the server 140. The server 140 may access data stored in the database 146 when executing various functions and tasks associated with the operation of the risk assessment system 100.

Although the risk assessment system 100 is shown to include one server 140, four mobile devices 125-128, eight risk variable collection modules 116-123, and one on-board computer 114, it is understood that different numbers of servers, mobile devices, risk variable collection modules, and on-board computers may be utilized. For example, the system 100 may include a plurality of servers and hundreds of risk variable collection modules or sensors, all of which may be interconnected via the network 130. Further, the one or more mobile devices 110 and/or the one or more risk variable collection modules 106 may perform the various functions described herein in conjunction with the on-board computer 114 or alone (in such cases, the on-board computer 114 need not be present). Likewise, the on-board computer 114 may perform the various functions described herein in conjunction with the mobile devices 125-128 and risk variable collection modules 116-123 or alone (in such cases, the mobile devices 125-128 and risk variable collection modules 116-123 need not be present).

Furthermore, the processing performed by the one or more servers 140 may be distributed among a plurality of servers 140 in an arrangement known as "cloud computing," in an implementation. This configuration may provide several advantages, such as, for example, enabling near real-time uploads and downloads of information as well as periodic uploads and downloads of information. Alternatively, the risk assessment system 100 may include only the front-end components 102. For example, one or more mobile devices 110 and/or on-board computer 114 may perform all of the processing associated with gathering data, identifying drivers of the vehicle, alerting or communicating with the vehicle operator, and/or generating appropriate insurance rates. As such, the risk assessment system 100 may be a "stand-alone" system, neither sending nor receiving information over the network 130.

The server 140 may have a controller 155 that is operatively connected to the database 146 via a link 156. It should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165. The program memory 160 may be configured to store computer-readable instructions that when executed by the processor 162 cause the server 140 to implement a server application 142 and a web server 143. The instructions for the server application 142 may cause the server 140 to implement the methods described herein. While shown as a single block in FIG. 1, it will be appreciated that the server application 142 may include a number of different programs, modules, routines, and sub-routines that may collectively cause the server 140 to implement the server application 142. It should be appreciated that although only one microprocessor 162 is shown, the controller 155 may include multiple microprocessors 162. Similarly, the memory of the controller 155 may include multiple RAMs 164 and multiple program memories 160. Further, while the instructions for the server application 142 and web server 143 are shown being stored in the program memory 160, the instructions may additionally or alternatively be stored in the database 146 and/or RAM 164. Although the I/O circuit 166 is shown as a single block, it should be appreciated that the I/O circuit 166 may include a number of different types of I/O circuits. The RAM(s) 164 and program memories 160 may be implemented as semiconductor memories, magnetically readable memories, and/or optically readable memories, for example. The controller 155 may also be operatively connected to the network 130 via a link 135.

Figure 2:
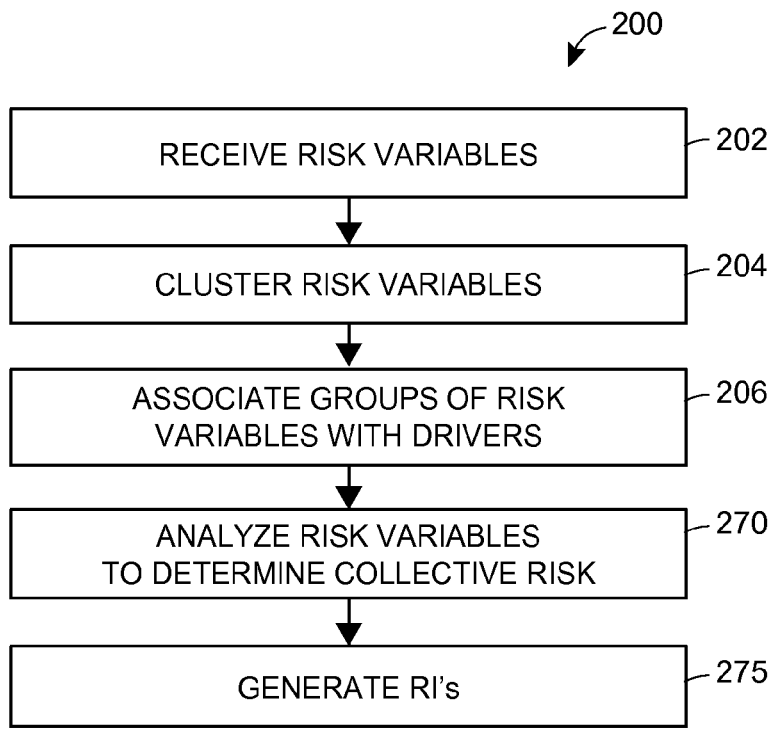
FIG. 2 is a flow diagram of an example method for identifying and assessing the risk associated with a vehicle operator which can be implemented in the system illustrated in FIG. 1.

FIG. 2 is a flow diagram of an example method 200 for identifying a driver of a vehicle, or vehicle operator, and profiling the risk associated with the driver. The method 200 may be implemented in the risk assessment system 100, for example.

Risk variables are received from front-end components, such as the front-end components 102, via a computer network, such as network 130 (block 202), in an implementation. The risk variables may be generated by one or more of the risk variable collection modules 106 and/or the one or more mobile devices 110, for example. The risk variables may correspond to any data useful for identifying the driver of the vehicle, driving behaviors, driving environments, etc., as described below with a series of example scenarios.

In one example scenario, the computer vision module 116 may use a variety of image sensors, such as one or more cameras, infrared sensors, etc., and one or more computer vision routines to gather data related to driver identification and behavior. Any suitable computer vision technique, known in the industry, may be used to match reference driver images (e.g. collected by insurance agents or uploaded by insurance customers) and still images taken by cameras of the computer vision module 116, for example. Alternatively or additionally, the computer vision module 116 may use motion tracking sensors to detect and cluster driver movements such as described in U.S. application Ser. No. 13/897,650 entitled "Risk Evaluation Based on Vehicle Operator Behavior" and filed on May 20, 2013, the entire disclosure of which is hereby incorporated by reference herein.

In another example scenario, the biometric sensor module 117 may collect and analyze data from a variety of biometric sensors. For example, deoxyribonucleic acid (DNA), fingerprint, or skin conductivity sensors may be used to collect data for identifying particular drivers by comparison to reference biometric data (e.g. collected by insurance agents or provided by insurance customers). Further, the biometric sensor module 117 may collect data from heart rate sensors, grip strength sensors, or other suitable biometric sensors useful for identifying and/or clustering driver behavior (e.g. stress, appropriate or inappropriate driving responses, etc.).

In yet another example scenario, the driving behavior module 118 may gather data from various vehicle sensors (e.g., a braking sensor, a speedometer, a tachometer, etc.) related to driver identification and behavior. For example, certain drivers may consistently brake with certain braking characteristics (e.g. as recorded in reference data or learned over time with a machine learning technique known in the industry) and another driver may brake with different braking characteristics. In such a case, a computing device may use data from braking sensors to identify the driver of the vehicle. Further, data from certain vehicle sensors may indicate levels of risk, in some scenarios. For example, high speed indications from a speedometer may indicate a high level of risk.

In still another example scenario, the motion sensor module 119 may gather data from motion sensors, such as accelerometers, gyroscopes, magnetometers, etc. For example, the motion sensor module 119 may communicate with one or more mobile devices, such as smart-phone 125, or one or more wearable sensors (e.g. on a key fob, bracelet, etc.) which include motion sensors. The motion sensor module 119 may identify and cluster driver behaviors, such as particular motions performed when entering or exiting the vehicle, habitual driving motions, etc., to identify the driver of a vehicle, for example.

In yet another example scenario, the identification signal module 120 gathers data related to customer communicated identification signals. For example, a customer may communicate an identification signal via a vehicle user interface (e.g. touchscreen, keypad, microphone, radio frequency identification (RFID) tag equipped device, Bluetooth-connected smartphone or tablet computer, etc.) to make use of user preferred vehicle setting such as seat adjustments, mirror adjustments, radio stations, air conditioning setting, etc. The identification signal may be a password, code, personal identification number (PIN), name, phrase, or any other suitable identification signal, and the identification signal module 120 may process the identification signal to identify the driver of the vehicle, in an implementation.

In still another example scenario, an audio sensor module 121 may analyze audio signals. For example, one or more microphones in the audio sensor module 121 may collect audio data, and the audio sensor module 121, or server 140, may execute a voice recognition routine, as known in the industry, to identify the driver of a vehicle. Further, audio data may be clustered to identify certain types of risky driver behavior such a talking on a phone, road rage, etc.

In yet another example scenario, a geopositioning module 122 may gather and analyze positioning data. For example, a GPS receiver may develop position and velocity fixes as a function of time, and the geopositioning module 122, or server 140, may attempt to identify a driver based on frequently visited points of interest or commonly used navigation routes. Further, the geopositioning module 122 may identify certain areas and times at which the driver of the vehicle is at high or low risk. For example, a position fix and timestamp may indicate that a driver is driving at rush hour in a major city.

In still another scenario, a preference module 123 may gather driver preference data. For example, driver preference data, gathered via communicative connections with equipment on-board the vehicle, may indicate that particular drivers have radio, air conditioning, seat, mirror, or other adjustment preferences, and, as such, the preference module 123 may identify drivers via driver preference data. Further, the preference module 123 may collect data indicating levels of risk, such as drivers frequently making radio adjustments while driving.

It is understood that any suitable module, computing device, mobile device or data collection system may collect risk variables, in combination with the above-mentioned risk variable collection modules 116-123 or independently, where the risk variables are associated with driver identification and/or driver behaviors, driving environments, etc. Further, the functionality, components, and/or data of the above-mentioned risk variable collection modules 116-123 may be combined in any suitable way to identify a driver, track driver behavior, detect driving environments, etc. Also, in some implementations, the risk variable collection modules 116-123 and/or the on-board computer 114 may include a clock device which assigns a timestamp (e.g. dates, hours, minutes, seconds) to the collected risk variables corresponding to the time at which the risk variables are gathered, detected, output from one or more sensors, etc.

Returning to FIG. 2, upon receiving risk variables (block 202), risk variables are clustered into groups of risk variables (block 204). For example, the server 140 may cluster risk variables into groups of risk variables each associated particular driver behaviors, preferences, etc. The server 140 may also group risk variables by levels of risk, in some implementations. For example, the server 140 may group risk variables into groups of risk variables associated with high risk variables, normal risk variables, low risk variables, etc.

In some implementations, the server 140 may cluster risk variables by comparing the risk variables with reference data. For example, reference positioning or traffic data may indicate areas of high and low risk driving, and the server 140 may compare risk variables collected from the geopositioning module 122 to this reference data to determine the grouping of risk variables.

One or more of the groups of risk variables is then associated with particular drivers of a vehicle, provided the particular drivers consented to such application of the risk variables, in an implementation (block 206). For example, the server 140 may use certain risk variables to identify a driver, while a timestamp is used to associate other risk variables, such as driver behavior data, with the identified driver. Thus, the server 140 identifies one or more drivers of a vehicle and associates, with those drivers, risk variables indicating driver behaviors, driving environments, vehicle preferences, etc.

In some implementations, the server 140 may supplement collected risk variables with pre-test and/or driving simulation test data or independently analyze driver pre-test and/or driving simulation test data. For example, the server 140, or other suitable computing device, may communicate, via the network 130, driver pre-tests and/or driving simulation tests to one or more of the mobile devices 110. Drivers may identify themselves, complete pre-tests and/or driving simulation tests, and communicate the resulting data to server 140 via network 130, in an implementation.

FIGS. 3A-3E illustrate an example driving simulation test used to collect data related to driver alertness, response, distraction levels, and cognitive abilities. The driving simulation test illustrated in FIGS. 3A-3E may be presented on one or more of the mobile devices 110, for example, and a driver may complete the driving simulation test by interacting with the simulation test via clicks, tap, physical motion, etc.

The driving simulation test is presented on a mobile device 220, and resembles the view from the driver's seat of a vehicle (i.e. from inside a virtual vehicle), in an implementation. The user of the mobile device 220 may "steer" the virtual vehicle in the simulation test by rotating or moving the phone from side to side. The simulation test may register this movement and rotate a displayed steering wheel 222 accordingly, for example. The user may also perform auxiliary driving functions such as braking, accelerating, activating/deactivating vehicle functions (e.g. lights, wipers, washer fluid), etc. and other functions, such as answering questions, during the course of the driving simulation test.

Figure 3A:
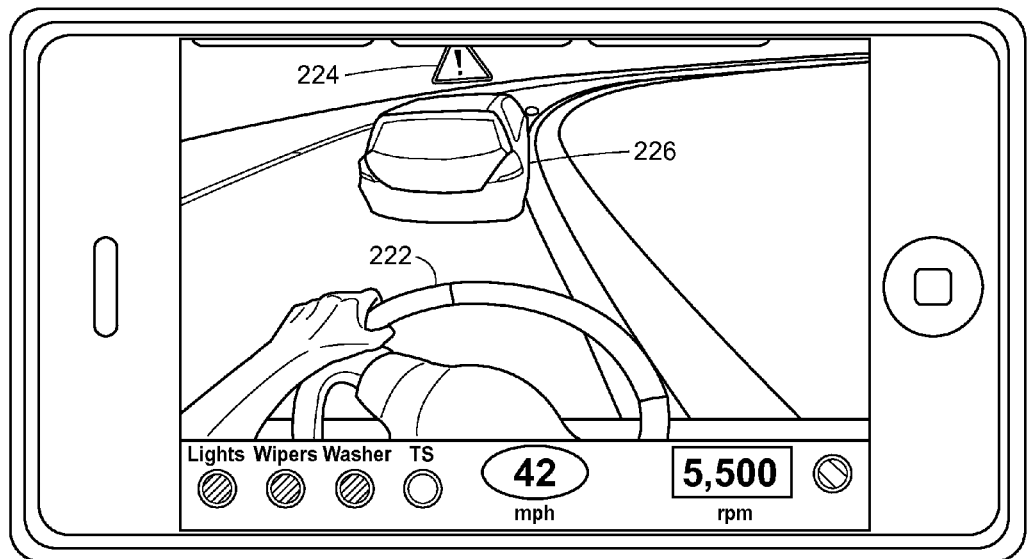
FIG. 3A-3E illustrate an example driving simulation test.

For example, FIG. 3A illustrates a brake response time portion of the driving simulation test in which an indication 224 of necessary braking is displayed above a nearby virtual car 226. The simulation test may assess driver brake response time by measuring the time difference between the time at which indication 224 is displayed and the time at which the user initiates a virtual braking function (e.g. via a click or tap).

Figure 3B:
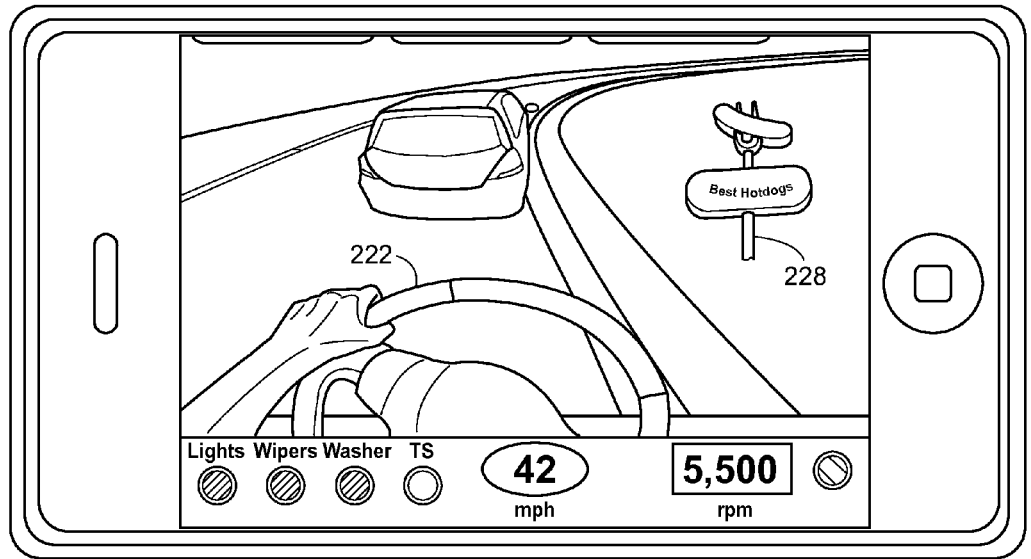

FIG. 3B illustrates an example road side distraction portion of the driving simulation test in which a sign 228, or other road side distraction, is displayed on the side of a virtual road. The simulation test may assess levels of user distraction by measuring virtual steering deviations upon the display of sign 228 or changes in virtual braking or acceleration upon the display of sign 228, for example.

Figure 3C:
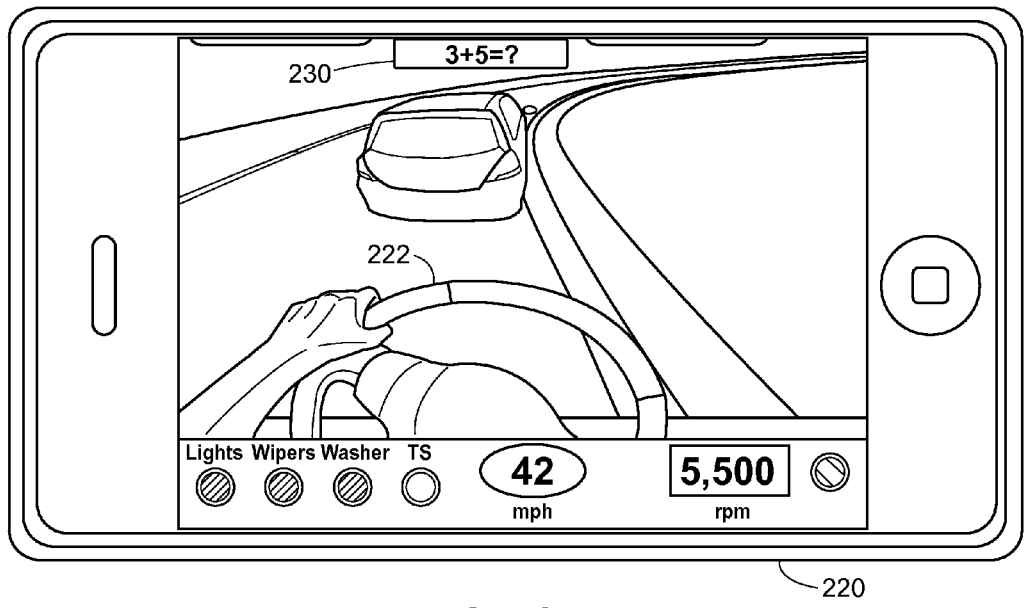

FIG. 3C illustrates an example cognitive distraction portion of the driver simulation test in which a cognitive test question 230 is displayed on the screen of the mobile device 220 while the user is driving a virtual vehicle. The cognitive test question 230 may be a math, trivia, or other question stimulating cognitive distraction, for example, and the driver may answer the cognitive test question 230 using a user interface of the mobile device 220 (e.g. touchscreen, keypad, verbal response, etc.). The simulation test may assess levels of cognitive distraction by measuring virtual steering deviations upon the display and subsequent answering of the cognitive test question 230 or changes in virtual braking or acceleration upon the display and subsequent answering of the cognitive test question 230, for example.

Figure 3D:
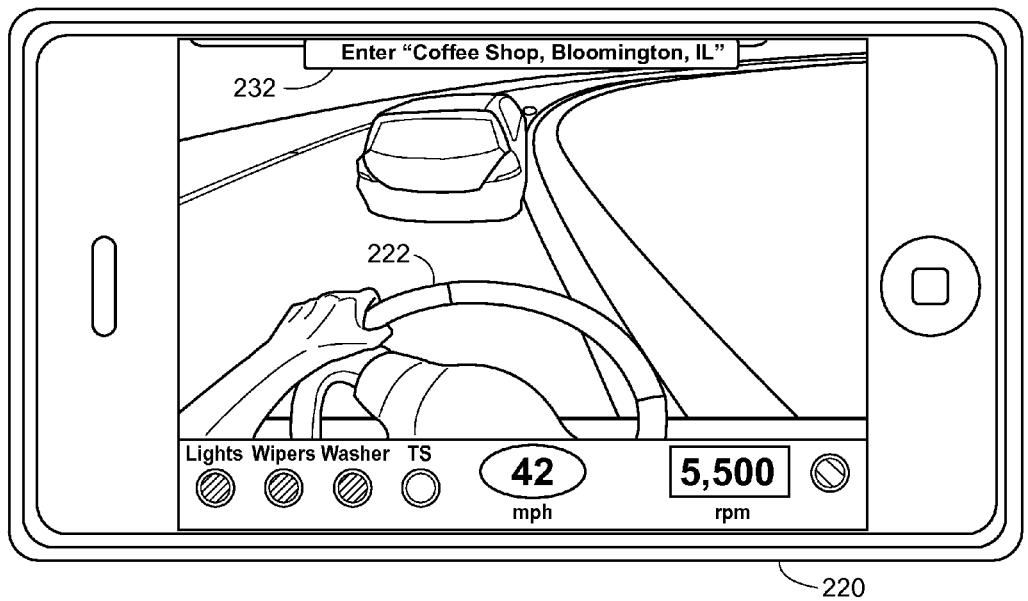

FIG. 3D illustrates a manual distraction portion of the simulated driving test in which a manual task 232 is displayed on the screen of the mobile device 220 while the driver is driving a virtual vehicle. The manual task 232 may include indications to activate/deactivate virtual vehicle functionality, enter a phrase or message via a user interface, or any other manual distraction task requiring manual driver interaction with the simulation test in addition to interactions required in driving the virtual vehicle. The simulation test may assess levels of manual distraction by measuring virtual steering deviations upon the display and subsequent performing of the manual task 232 or changes in virtual braking or acceleration upon the display and subsequent performing of the manual task 232, for example.

Figure 3E:
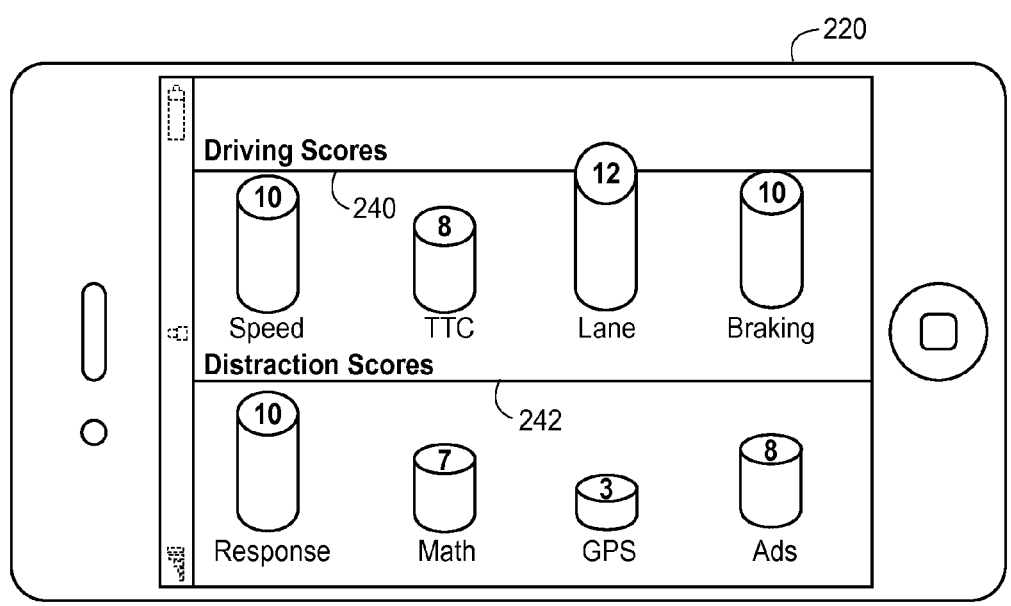

Upon completion of the driving simulation test portions, the simulation test may present the driver (i.e. the user of the mobile device 220) with a "scoreboard" of results. FIG. 3E illustrates an example scoreboard presented to the driver in which a variety of driving scores 240 and distraction scores 242 are displayed to the driver. In addition to reporting the results to the driver, the mobile device 220 may send the results of the driving test to server 140 for use in identifying and profiling drivers of a vehicle, in an implementation. For example, the results may be sent as normalized numeric scores to the server 140 for comparison with average reference scores from other insurance customers. In some implementations, drivers may also export driving simulation test scores to a social web application such as Facebook® or Twitter.

It is understood that the driving simulation test illustrated in FIGS. 3A-3E is included for illustrative purposes. The server 140 may utilize data from any suitable pre-test and/or driving simulation test adapted to test driver performance, distraction, cognitive ability, etc. For example, the server 140 may utilize results of a written pre-test, proctored by an insurance agent, consisting of questions related to commonly encountered driving situations, in an implementation.

Returning again to FIG. 2, the gathered and grouped risk variables, pre-test data, and/or driving simulation test data are analyzed to determine a collective level of risk for one or more drivers of the vehicle (block 270), provided the one or more drivers consented to such application of the risk variables. The server 140 combines or compares the various gathered risk variables to determine an accurate level of risk, in some scenarios. For example, a particular driver may drive frequently in high traffic areas, as determined from positioning data, which would independently (i.e. when considered alone) be associated with high risk, but the same driver may show consistently good high traffic driving habits, as determined from biometric, behavior, computer vision, etc. data. In such an example case, the server 140 may determine that the driver is associated with low risk by comparing data from multiple sources (e.g. positioning, biometric, computer vision, etc.), even though data from one of the sources (e.g. positioning) may indicate high risk.

In another example case, a particular driver may drive frequently in the day and not frequently at night, as determined from timestamps, imagery, positioning, etc. data, which would independently be associated with low risk. However, the same driver may frequently text while driving, adjust the radio, and apply makeup while driving, as determined from computer vision, motion sensing, audio, etc. data. In such an example case, the server may determine that the driver is associated with high risk by comparing data from multiple sources, even though data from one of the sources (e.g. timestamps or positioning) indicates low risk.

By comparing risk variables from a plurality of sources, the server 140 is able to develop a detailed (i.e. granular) profile of drivers of a vehicle, in an implementation. The server 140 may, therefore, associate risk with drivers in an accurate and up-to-date way, for example.

Further, risk indices (RI's), based on the analysis of the risk variables, are developed (block 275). For example, risk indices may include a normalized number representing relative driver risk with respect to other drivers and/or reference data. A provider of insurance may have a preferred type of method of generating a RI, and such preferred types and methods may be integrated with the method 200, in some implementation. For example, an RI may be a grade between zero and one hundred with a score of sixty or below indicating failure, or very high risk, and a score close to one hundred indicating low risk.

Figure 4:
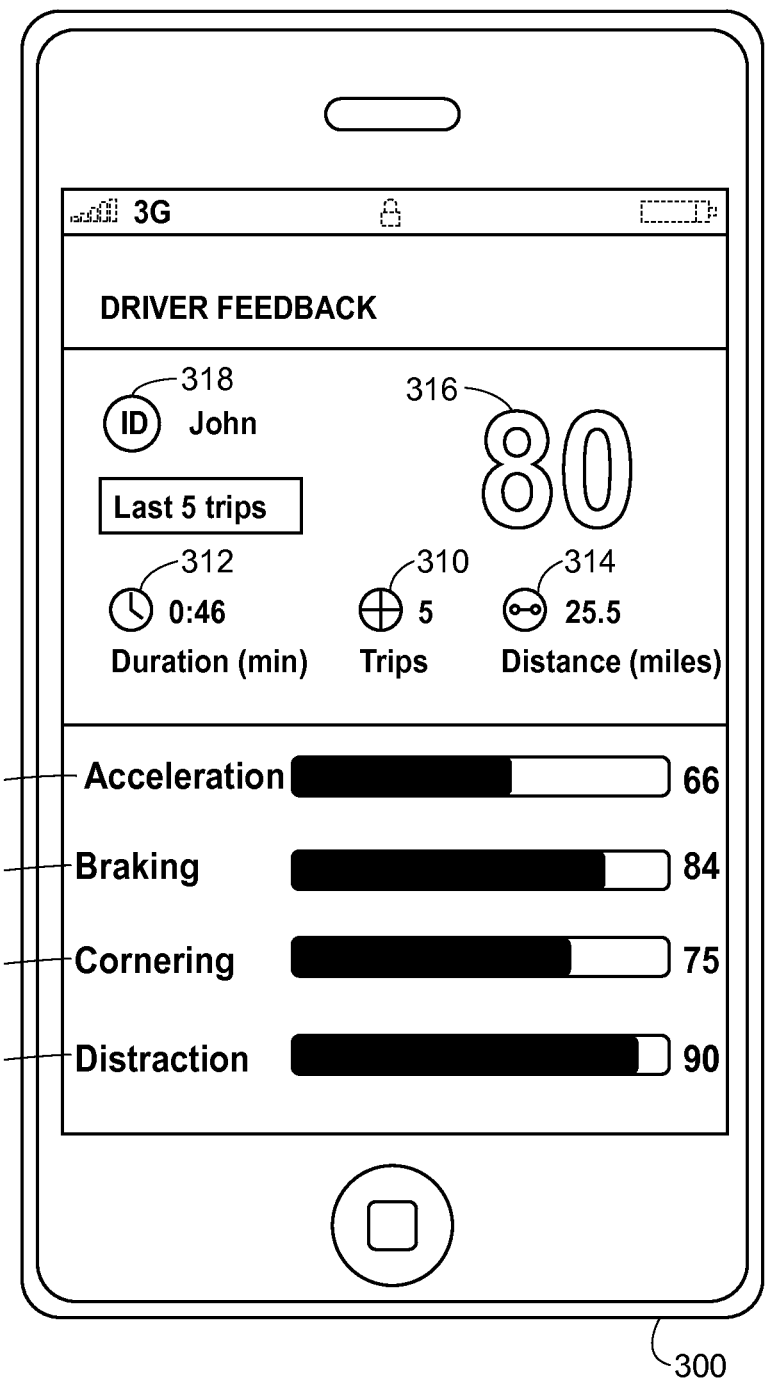
FIG. 4 illustrates an example driver risk report displayed on a mobile device.

In some scenarios, the server 140 may communicate a report of driver risk to insurance customers via the network 130. For example, the server 140 may develop a driver risk report for display on one of the mobile devices 110. FIG. 4 illustrates an example driver risk report displayed on mobile device 300. The mobile device 330 may be implemented as smartphone 125, for example, and communicate with server 140 via network 130. The example driver risk report includes grades (i.e. a number between one and one hundred representing performance) in particular categories, where the grades in the particular categories may be developed by the server 140 based on clustered risk variables. For example, the driver risk report may include an acceleration grade 302, braking grade 304, cornering grade 306, and distraction grade 308. Also, the driver risk report may include a number of recent trips 310, a duration of recent trips 312, a distance of recent trips 314, a RI 316 or indication of collective risk, an identification of one or more drivers 318, an indication of risk variables leading to high risk (not shown), suggestions for safer driving or improving the RI 316 (not shown), etc.

Figure 5:
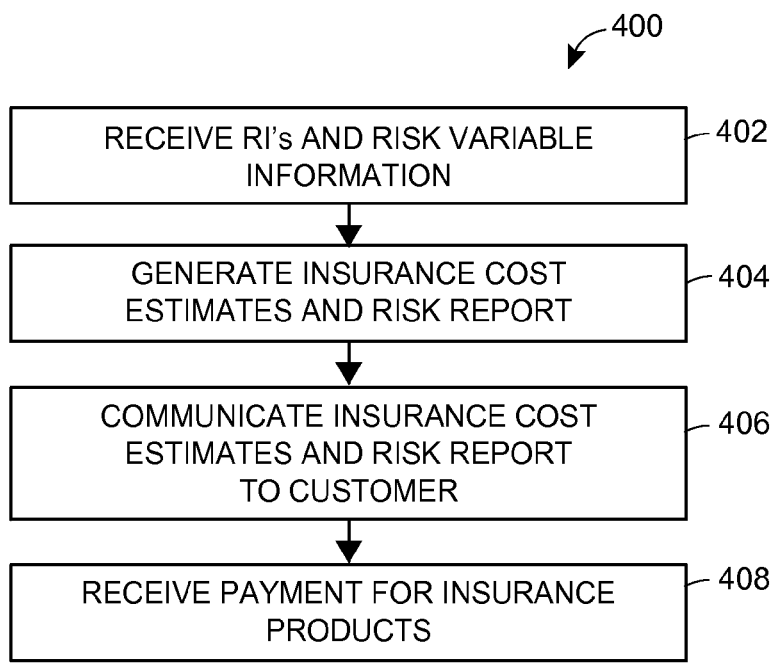
FIG. 5 is a flow diagram of an example method for generating insurance rates based on risk profiles and obtaining payment for insurance costs which can be implemented in the system illustrated in FIG. 1.

FIG. 5 illustrates a flow diagram of an example method 400 for utilizing risk profiles or risk indices to generate insurance rates and facilitate insurance payments. The method 400 may be implemented in server 140, for example, and the risk profiles and risk indices may be generated using method 200, for example.

Risk profiles, such as those including RI's and indications of high risk variables, are received (block 402). The risk profiles may then be used to generate appropriate insurance rates (block 404), in an implementation. For example, the server 140 may use appropriate insurance metrics along with the risk associated with drivers of a vehicle to generate an appropriate insurance rating for insuring the vehicle. In some implementations, the server 140 may generate a driver risk report, such as the driver risk report illustrated in FIG. 3E, including insurance rates. Thus, insurance customers may be able to easily view levels of risk and the associated levels of risk, for example, and the insurance customers may modify driving habits to minimize insurance costs.

In some implementations, generated insurance rates, based on gathered risk variables, may follow a driver regardless of the particular vehicle the driver is operating. For example, the server 140 may use positioning data from one of the mobile devices 110 or the geopositioning module 122, identification signals from identification signal module 120, or one or more other risk variable collection devices or modules to determine what vehicles a driver is operating. The server 140 may then generate an appropriate insurance rate for an insurance product that will follow the driver across any driving situation, such as driving a personally owned vehicle, family owned vehicle, peer owned vehicle, shared vehicle, rental vehicle, etc.

The generated insurance rates and driver risk report may be communicated directly to a mobile device, such as one of the mobile devices 110, via a computer network (block 406). For example, the server 140 may electronically communicate the rates and risk report via email, text message, hyperlink, etc. to one of the mobile devices 110. In some implementations, the insurance company, operating server 140, may also communicate the insurance rates and driver risk report to insurance customers in any other suitable way, such as physical mail, telephone calls, etc.

In response to the communication of insurance rates, payment for the associated insurance products is received (block 408), in one scenario. For example, the payment may include a communication from one of the mobile devices 110 to the server 140 including credit card information, payment scheduling information, etc.

Figure 6:
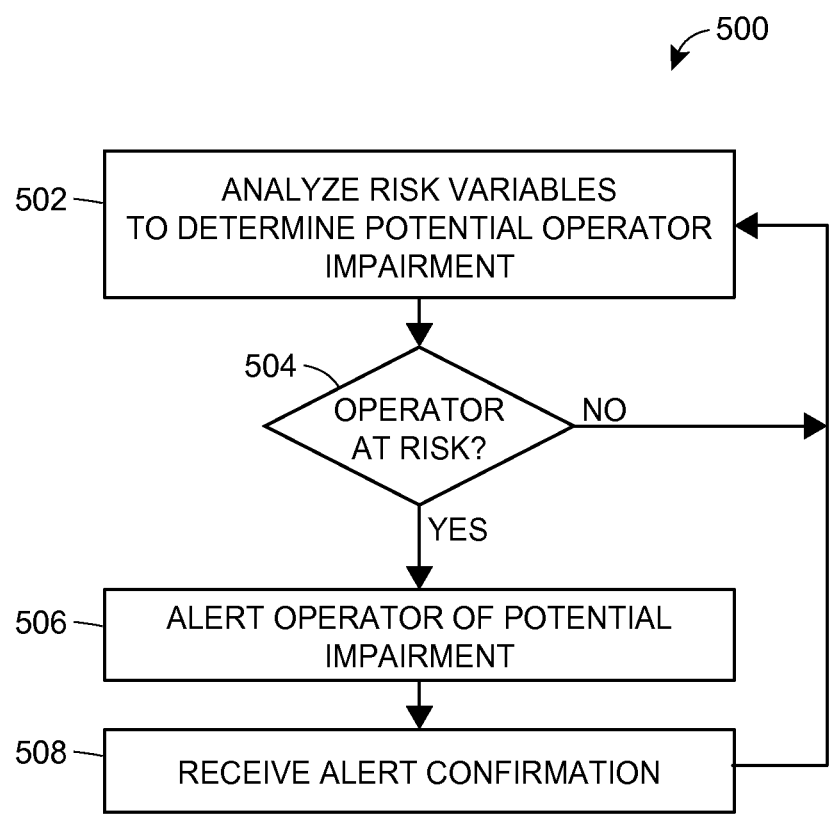
FIG. 6 is a flow diagram of an example method for alerting potentially impaired vehicle operators which can be implemented in the system illustrated in FIG. 1.

FIG. 6 is a flow diagram of an example method 500 for alerting drivers of possible impairment based on an analysis of risk variables. The method 500 may be implemented in the risk assessment system 100, for example.

Risk variables, such as the risk variables discussed in reference to FIG. 2, are analyzed to determine possible vehicle operator impairment (block 502). The analysis to determine possible vehicle operator impairment may be combined with the analysis to associate risk levels with driver (block 270 of FIG. 2), or the analysis to determine possible vehicle operator impairment may be performed independently, in an implementation. For example, the server 140 may analyze the risk variables gathered from the front-end components 102 that may indicate vehicle operator impairment.

In an example scenario, the server 140 may analyze computer vision data to identify vehicle operator behavior associated with the vehicle operator being drowsy, asleep, distracted, intoxicated, ill, etc. The server may then determine, based on the analysis of the risk variables, if the operator is likely to be impaired (block 504). If the vehicle operator is not likely to be impaired, the flow reverts to block 502 where further risk variables may be analyzed. In some implementations, the analysis of risk variables for identifying operator impairment may be performed periodically or any time new risk variables (i.e. risk variables that have not yet been analyzed) are available.

Figure 7:
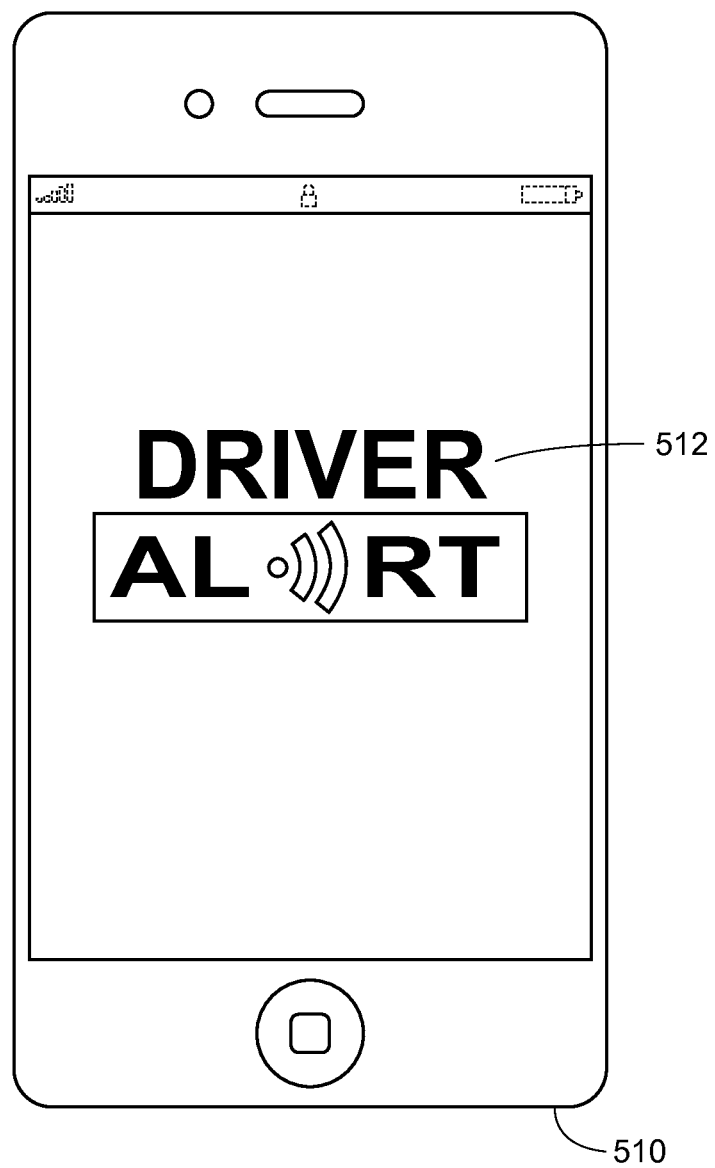
FIG. 7 illustrates an example alert displayed on a mobile device.

If the vehicle operator is likely to be impaired, the flow continues to block 506 where an alert may be sent to the vehicle operator, via the driver alert interface 108 or one or more of the mobile devices 110, for example. The alert may be at least one or more of an audible alert, a visual alert, or a tactile alert. For example, a tactile alert system may cause a driver's seat to vibrate, or an audible alert system may cause a chime, claxon, siren, etc. and/or a custom recorded sound such as a sound clip or ringtone to be played through one or more speakers. In another example, an alert may include a mobile device alert including visual displays, sounds, and/or messages displayed on one or more of the mobile devices 110. FIG. 7 illustrates an example mobile device alert including a visual alert display 512 on a mobile device 510.

In some implementations, the server 140 may continuously or periodically alert the vehicle operator until the server 140 receives an alert confirmation from the vehicle operator (block 508). For example, the vehicle operator may tap or click visual alert display 512 of the example mobile device alert to confirm receipt of the alert at which time a confirmation signal is communicated to the server 140 via the network 130.

What is claimed is:

1. A computer-implemented method for assessing risk associated with a driver of a vehicle, the method comprising:
   receiving, via a network interface, a plurality of risk variables associated with a driver, the plurality of risk variables being gathered when the driver operates the vehicle;
   causing one or more processors to determine the driver from a plurality of drivers based on the plurality of risk variables, wherein determining the driver includes:
   clustering the plurality of risk variables into a plurality of groups of risk variables, and
   associating at least one of the plurality of groups of risk variables with the driver; and causing the one or more processors to develop a risk profile for the driver based on the associated groups of risk variables, wherein developing a risk profile for the driver includes:
   determining a risk corresponding to at least some of the associated groups of risk variables, and generating a risk index, the risk index being a collective measure of risk corresponding to the driver and the risk index being based on the risk corresponding to the associated groups of risk variables;
   wherein the plurality of risk variables includes at least two of the following risk variables:
   measurements of driver behavior, driving times, driving environment measurements, motions sensor data, images of drivers, audio data, biometric sensor data, or geographic location data.

2. The computer-implemented method of claim 1, further comprising:
   causing one or more processors to create a report of the risk profile for an insurance customer, the report of the risk profile including at least one of risk indices, estimated insurance costs, insurance rates, or payment instructions;
   communicating, via the network interface, the report of the risk profile to the insurance customer.

3. The computer-implemented method of claim 1, further comprising:
   causing one or more processors to generate insurance rates for an insurance product consistent with one or more risk profiles associated with the driver;
   communicating, via the network interface, insurance costs for the insurance product according to the generated insurance rates; and
   receiving, via the network interface, payment for the insurance product.

4. The computer-implemented method of claim 1, wherein the plurality of risk variables are gathered when the driver operates the vehicle and when the driver operates other vehicles.

5. The computer-implemented method of claim 1, wherein the risk variables are gathered when the driver operates the vehicle and when the one or more drivers complete at least one of cognitive ability tests or driving simulation tests.

6. The computer-implemented method of claim 5, wherein the one or more drivers are given rewards in exchange for completing the cognitive ability tests or driving simulation tests, the rewards including at least one of discounts, coupons, or prizes.

7. The computer-implemented method of claim 1, wherein the risk profile is adjusted periodically based on accumulated risk variables.

8. A computer device for assessing risk associated with a driver of a vehicle, the computer device comprising:
   one or more processors; and one or more memories coupled to the one or more processors;
   wherein the one or more memories include computer executable instructions stored therein that, when executed by the one or more processors, cause the one or more processors to:
   receive, via a network interface, a plurality of risk variables associated with a driver, the plurality of risk variables being gathered when the driver operates the vehicle;
   determine the driver from a plurality of drivers based on the plurality of risk variables, the determination of the driver including:
   clustering the plurality of risk variables into a plurality of groups of risk variables;
   associating at least one of the plurality of groups of risk variables with the driver; and
   develop a risk profile for the driver based on the associated groups of risk variables, wherein developing a risk profile for the driver includes:
   determining a risk corresponding to at least some of the associated groups of risk variables, and
   generating a risk index, the risk index being a collective measure of risk corresponding to the driver and the risk index being based on the risk corresponding to the associated groups of risk variables;
   wherein the plurality of risk variables includes at least two of the following risk variables:
   measurements of driver behavior, driving times, driving environment measurements, motions sensor data, images of drivers, audio data, biometric sensor data, or geographic location data.

9. The computer device of claim 8, further comprising:
causing one or more processors to generate insurance rates for an insurance product consistent with one or more risk profiles associated with the driver;
communicating, via the network interface, insurance costs for the insurance product according to the generated insurance rates; and
receiving, via the network interface, payment for the insurance product.

10. The computer device of claim 8, wherein the plurality of risk variables are generated by devices that are: (i) permanently installed in the vehicle, or (ii) temporarily disposed in the vehicle.

11. The computer device of claim 10, wherein the plurality of risk variables are generated by mobile computing devices including at least one of smartphones, tablet computers, personal digital assistants, laptop computers, or mobile phones temporarily disposed in the vehicle.

12. The computer device of claim 8, wherein the risk variables are gathered when the driver operates the vehicle and when the one or more drivers complete at least one of cognitive ability tests or driving simulation tests.

13. The computer device of claim 8, wherein the risk profile is adjusted periodically based on accumulated risk variables.

14. A computer readable storage medium comprising non-transitory computer readable instructions stored thereon for assessing risk associated with a driver of a vehicle, the instructions, when executed on one or more processors, cause the one or more processors to:
receive, via a network interface, a plurality of risk variables associated with a driver, the plurality of risk variables being gathered when the driver operates the vehicle;
determine the driver from a plurality of drivers based on the plurality of risk variables, the determination of the driver including:
clustering the plurality of risk variables into a plurality of groups of risk variables;
associating at least one of the plurality of groups of risk variables with the driver; and
develop a risk profile for the driver based on the associated groups of risk variables, wherein developing a risk profile for the driver includes:
determining a risk corresponding to at least some of the associated groups of risk variables, and
generating a risk index, the risk index being a collective measure of risk corresponding to the driver and the risk index being based on the risk corresponding to the associated groups of risk variables;
wherein the plurality of risk variables includes at least two of the following risk variables:
measurements of driver behavior, driving times, driving environment measurements, motions sensor data, images of drivers, audio data, biometric sensor data, or geographic location data.

15. The computer readable storage medium of claim 14, further comprising:
causing one or more processors to generate insurance rates for an insurance product consistent with one or more risk profiles associated with the driver;
communicating, via the network interface, insurance costs for the insurance product according to the generated insurance rates; and
receiving, via the network interface, payment for the insurance product.

16. The computer readable storage medium of claim 14, wherein the risk variables are gathered when the driver operates the vehicle and when the one or more drivers complete at least one of cognitive ability tests or driving simulation tests.

17. The computer readable storage medium of claim 14, wherein the risk profile is adjusted periodically based on accumulated risk variables.

* * * * *